INVENTOR
AARON OKEN

BY *Robert D. Emmick*

AGENT

June 15, 1965  A. OKEN  3,189,573
PETROLEUM WAX-ETHYLENE VINYL ACETATE
COPOLYMER COMPOSITION
Filed Oct. 1, 1962  4 Sheets-Sheet 4

FIG. 6

INVENTOR
AARON OKEN

BY Robert D. Emmick

AGENT

United States Patent Office 3,189,573
Patented June 15, 1965

3,189,573
PETROLEUM WAX-ETHYLENE VINYL ACETATE COPOLYMER COMPOSITION
Aaron Oken, Kennett Township, Pa., assignor to E. I. du Pont de Nemours and Company, Wilmington, Del., a corporation of Delaware
Filed Oct. 1, 1962, Ser. No. 227,356
21 Claims. (Cl. 260—28.5)

This is a continuation-in-part of my copending application Serial No. 24,945 filed April 27, 1960, now abandoned which in turn is a continuation-in-part of my earlier application Serial No. 788,708, filed January 26, 1959, now abandoned.

This invention relates to new compositions of matter and, more particularly, this invention relates to novel coating compositions containing specific amounts of certain ethylene/vinyl acetate (E/VA) copolymers and petroleum wax in combinations that have superior and unexpected properties.

A study of the prior art will disclose numerous combinations of ethylene-containing copolymers, natural and synthetic resins, rubbers and the like as additives to various types of waxes. These combinations are suggested as adhesives, coatings and other formulations useful in a wide variety of applications.

Insofar as wax coating compositions are described in the literature, most of the art analogous to the present invention relates to compositions which contain a number of constituents. These compositions containing many components reflect efforts that have been made to impart to the wax such properties as adhesiveness, heat-sealability, flexibility, hardness, gloss, high blocking temperature, and other desirable characteristics.

In U.S. Patent 2,877,196 to Frederick P. Reding, compositions consisting predominantly of petroleum wax with 0.1 to 20% by weight of E/VA copolymers are disclosed. By the use of E/VA copolymers containing 5 to 25%, preferably 15 to 20% by weight of copolymerized vinyl acetate, wax compositions having improved ductility and increased tensile strengths over unmodified wax or polyethylene-modified wax are obtained. The E/VA copolymer-wax blends are more compatible than polyethylene-wax blends as indicated by the temperature differential between the cloud point or haze point of the blend and the melting point of the wax. The patent points out that compatiblity is an important property since two-phase mixtures show little improvement over unmodified wax. In addition, compatibility of the wex blend, in particular, the haze point of the blend, is of considerable importance in impregnating and coating operations. In these operations, the temperature of the wax melt is maintained as low as possible to permit the coating to set quickly, to avoid oxidative degradation of the wax and to avoid damage to heat-sensitive substrates being coated. With a small temperature differential between the haze point of the wax blend and the melting point of the wax, it is possible to operate at the low temperature desired.

The Reding patent further discloses that wax compositions containing up to about 50% by weight of E/VA are not homogeneous and give some separation of copolymer. In order to prepare a truly non-separating wax composition, an E/VA content of 0.1 to 10% by weight is required.

In contrast to the high-wax content compositions of the Reding patent and the incompatible blends obtained with higher concentrations of E/VA in the blend, I have found that remarkably flexible and compatible compositions are obtained if a critical relationship is maintained between the percentages of wax and E/VA copolymer in the blend, the copolymerized vinyl acetate content of the E/VA copolymer, and the melt index of the E/VA copolymer.

The closed area ABCD of FIGURE 1 represents my compositions which have the percentage compositions of wax and E/VA copolymer in the blend and weight percentage of vinyl acetate in the copolymer, required to yield a compatible composition, that is one having a haze point within 5° C. of the melting point of the wax. Dependent on a critical relationship between the melt index of the E/VA copolymer and the minimum E/VA content of the composition, these compositions, within closed area ABCD of FIGURE 1 have sufficient flexibility, as defined hereinafter, to provide moistureproof coatings on paper, which coatings retain their moistureproof properties after flexing.

Figure 1:
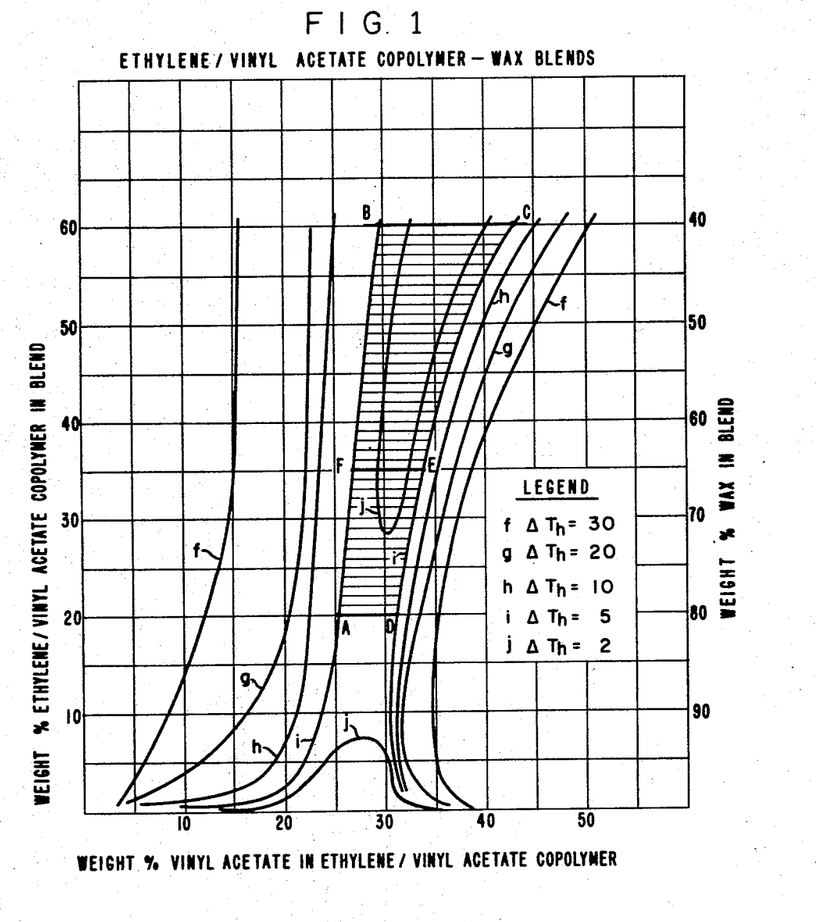
FIGURE 1 is a graph in which contour lines are shown which outline E/VA-wax blend compositions having haze points a given number of degrees (centigrade) higher than the melting point of the wax. Thus, the two contour lines, $\Delta T_h = 5$, indicate the relationship required between the E/VA copolymer and wax contents of the blend and the vinyl acetate content of the E/VA copolymer, to yield compatible blends having haze points within 5° C. above the melting point of the wax. $\Delta T_h$ is defined as the temperature differential in degrees centigrade between the haze point of the E/VA-wax blend and the melting point of the wax.

My compositions containing the higher amounts of E/VA and within the closed area ABCD of FIGURE 1 and having the aforementioned critical melt index relationship, exhibit far greater heat-seal strengths and an entirely different order of flexibility than the prior known wax compositions containing 1 to 20% E/VA. The compositions also differ in other respects. Thus, while both compositions are heat-sealable and moistureproof, the prior compositions are predominantly wax compositions and have viscosities that approach those of the petroleum waxes at temperatures of about 60–100° C., i.e., in the melting range. Such E/VA wax compositions are easily applied at low temperatures by dip coating or hot-melt coating. The thermoplastic compositions of the present invention must be heated to at least 100–175° C. in order to be sufficiently fluid for conventional hot-melt coating equipment and technique. However, because of their compatibility, they can be applied conveniently by conventional extrusion techniques at temperatures only slightly above the melting point of the wax. These compositions are especially adaptable for paper, paperboard, synthetic polymer films, aluminum foil and other substrates that are subject to flexing and wear, since they are extremely flexible and tough. Coatings of such compositions remain heat-sealable and moistureproof even after repeated creasing and flexing.

It is an object of the present invention to provide a new coating composition that is heat-sealable and moistureproof.

It is another object of the present invention to provide a new coating composition that is extremely flexible and tough.

It is a further object of the present invention to provide a new coating composition that can be applied to substrates by conventional extrusion or hot-melt coating techniques and equipment.

A further object is to provide substrates having a flexible and heat-sealable coating thereon. A still further object is to provide a flexible and compatible composition which can be molded or otherwise formed into shaped articles.

Figure 6:
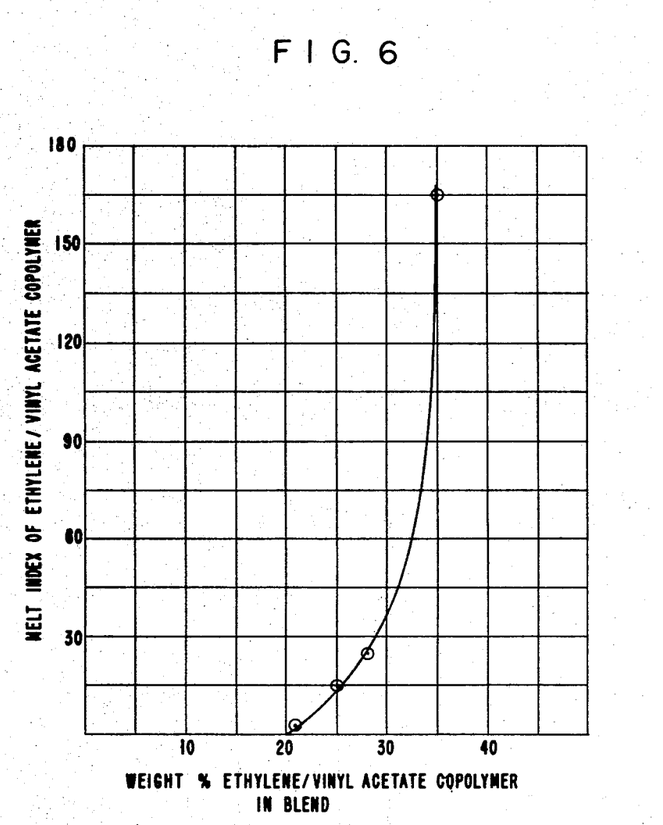
FIGURE 6 is a graph showing the effect of melt index on the minimum E/VA concentration in a wax blend required to provide sufficient flexibility that coatings on paper will retain their moistureproof properties after flexing.

These and other objects are accomplished with compositions consisting essentially of petroleum wax and a copolymer of ethylene and vinyl acetate, the weight percentages of wax and copolymer in the composition and the weight percentage of vinyl acetate in the copolymer being represented by a point within the closed area ABCD of FIGURE 1, with the proviso that the minimum E/VA copolymer content of the composition in the area between lines AD and EF of FIGURE 1 is dependent on the melt index of the copolymer and is defined by the equation:

$$\text{Percent copolymer} = 35 - 15(0.9715)^{MI}$$

where MI represents the melt index of the copolymer. The minimum copolymer content of the blend is that quantity which is required to yield compositions of sufficient flexibility so that paper coated therewith retains its moistureproof properties after flexing. The above equation, which is shown graphically in FIGURE 6, defines the minimum copolymer content of wax blends containing E/VA copolymers having a melt index from about 0.1 to 500. The calculated value of percent copolymer approaches but does not exceed 35%. This is in agreement with the observation that at melt indices above 165 and up to about 500, the minimum copolymer content required is 35%, which is indicated by line EF of FIGURE 1. Thus at levels of 35% copolymer in the composition and over, the melt index of the copolymer is not a critical factor in the flexibility of the blend. For this reason, compositions in which the weight percentages of wax and ethylene/vinyl acetate copolymer in the composition and the weight percentage of vinyl acetate in the copolymer are represented by a point within the closed area BCEF of FIGURE 1, are flexible throughout the entire range of melt index from about 0.1 to about 500.

Although compositions containing more than 60% by weight of copolymer can be used, my compositions are limited to those containing no more than 60% chiefly because of economic considerations. The E/VA copolymer being more costly than wax, it is obviously desirable to use compositions containing as much wax as possible consistent with obtaining the desired flexibility and compatibility. In addition, paper coated with compositions containing larger amounts of copolymer have a tendency to block. Particularly preferred compositions are those containing 60 weight percent of wax and 40 weight percent of an E/VA copolymer containing 28 to 35 weight percent of copolymerized vinyl acetate.

The melt index of the copolymers referred to above is determined by the tentative ASTM test method D 1238–57T. Molecular weight of the copolymer is an inverse function of the melt index. An alternate method to indicate the molecular weight of the E/VA copolymer is by means of its inherent viscosity as determined with 0.25% by weight of the copolymer in toluene at 30° C. E/VA copolymers with an inherent viscosity of 0.5–1.5 are suitable for use in this invention and copolymers having an inherent viscosity of 0.6–1.2 are preferred. It has been found that compositions containing E/VA copolymers having inherent viscosities lower than about 0.5 do not have sufficient strength for most applications. Copolymers of higher inherent viscosities than 1.5 are difficult to prepare under conditions which are practical commercially. The approximate relationship between melt index and inherent viscosity of E/VA copolymers is indicated in Table I. The melt indices of E/VA copolymers having intermediate inherent viscosities not listed in Table I can be determined by interpolation.

TABLE I

| Melt index: | Inherent viscosity |
|---|---|
| <0.1 | 1.5 |
| 0.2 | 1.3 |
| 0.5 | 1.2 |
| 2 | 1.08 |
| 5 | 0.99 |
| 10 | 0.91 |
| 15 | 0.85 |
| 25 | 0.78 |
| 50 | 0.72 |
| 100 | 0.66 |
| 140 | 0.63 |
| 200 | 0.6 |
| 500 | 0.5 |

The term "petroleum wax" as used herein refers to both paraffin and microcrystalline waxes. Paraffin wax is a mixture of solid hydrocarbons derived from the overhead wax distillate fraction obtained from the fractional distillation of petroleum. After purification, paraffin wax contains hydrocarbons that fall within the formulas $C_{23}H_{48}$—$C_{29}H_{60}$. It is a colorless, hard and translucent material having a melting point of about 125–165° F. Microcrystalline wax is obtained from the non-distillable still residues from the fractional distillation of petroleum. It differs from paraffin wax in having branched hydrocarbons of higher molecular weights. It is considerably more plastic than paraffin wax and has a melting point of about 150–200° F.

Paraffin wax is the preferred wax because it provides better moistureproofing than microcrystalline wax. In addition, paraffin waxes in general have better color. Highly refined microcrystalline waxes with good color are available but are more costly than paraffin waxes with equivalent color properties.

The copolymers of ethylene and vinyl acetate used in my compositions can be prepared by methods well known in the art. Thus, the procedures described in U.S. Patent 2,200,429 or 2,703,794 may be used. The vinyl acetate content of the copolymer can be determined by infrared analysis or by saponification number determination.

The following examples further illustrate my new compositions.

*Example 1*

Wax-E/VA copolymer compositions were prepared by heating a paraffin wax having a melting point of 55° C. with varying amounts of E/VA copolymer to yield compositions containing from 1 to 60% by weight of E/VA. A series of E/VA copolymers containing varying amounts of copolymerized vinyl acetate were used. The haze points of these mixtures were determined by slowly cooling the molten mixtures at a rate of about 1° C. per minute, and observing the temperature at which the mixture became cloudy due to precipitated copolymer.

The data on haze points were used to construct the contour lines of constant $\Delta T_h$ (temperature differential between the haze point and melting point of the wax), shown in FIGURE 1. This figure indicates that the haze temperatures are dependent upon both the vinyl acetate content of the E/VA and the E/VA content of the wax blend. Below about 26% vinyl acetate in the E/VA, the haze points of blends increase with E/VA concentration and then level off at a temperature which is a function of the vinyl acetate content. Above about 30% vinyl acetate, haze points increase briefly as E/VA concentration in the blend increases and then decrease rapidly with a further increase in E/VA concentration to temperatures only 1–5° C. greater than the melting point of the wax. For example, one copolymer containing 36.0% vinyl acetate had a haze point of 97° C. ($\Delta T_h = 42$) at a 5% E/VA concentration and a haze point of 57° C. ($\Delta T_h = 2$) at 50% E/VA concentration.

The E/VA copolymers used in these compositions had an inherent viscosity, as measured in a toluene solution at a concentration of 0.25% by weight and a temperature of 30° C. within the range of 0.6 to 1.3. These variations in inherent viscosity have no significant effect on the haze temperature of E/VA-wax blends.

The same temperature differentials between the haze points of the E/VA-wax blends and the melting point of the wax are obtained with waxes having higher or lower melting points than the material used in Example 1.

*Example 2*

Pigment (TiO$_2$)-coated sulfite paper (25 lb./ream) was coated on the pigmented side with a variety of E/VA-wax blends by various methods including hot-melt coating, extrusion coating and solvent coating. The coated papers were tested for water vapor transmission (WVT) of flat and creased samples. The results obtained are summarized in Table II.

should be no more than about 50% greater than that of the flat sample and both should be below about 3.5 g./100 in.$^2$/24 hours, when determined by the method described in this example. An alternate and preferred criterion of acceptable moistureproofing is that the absolute increase in water vapor transmission of the creased sample over the flat sample be no more than 0.75 g./100 in.$^2$/24 hours. Water vapor transmission rate tests provide not only a measure of the absolute moisture vapor permeability but also a measurement of the flexibility of coated paper samples, and thereby a measurement of the flexibility of the coating composition. E/VA-wax compositions are considered to be flexible if they provide moistureproof coatings on paper, that is, coatings which show a differential of 0.75 g./100 in.$^2$/24 hours or less between the flat and creased water vapor transmission rates.

The results of Example 2 further show that compositions containing microcrystalline wax are not as effec-

TABLE II

| | E/VA | | | Paraffin wax, M.P. °F. | Method of application | Loading, lb./ream | WVT [b] (g. H$^2$O/ 100 in.$^2$/24 hours) | |
|---|---|---|---|---|---|---|---|---|
| | Percent vinyl acetate | Inherent viscosity [a] | Percent in wax blend | | | | Flat | Creased [c] |
| 1 | 28.0 | 1.48 | 6 | 147 | Hot-melt | 11.9 | 1.0 | 4.4 |
| 2 | 33.5 | 0.89 | 6 | 147 | ___do___ | 12.0 | 1.0 | 6.5 |
| 3 | 34.2 | 1.1 | 9 | 147 | ___do___ | 11.0 | 0.6 | 6.1 |
| 4 | 27.9 | 0.96 | 12 | 147 | ___do___ | 11.9 | 1.6 | 5.2 |
| 5 | 34.2 | 0.63 | 20 | 147 | ___do___ | 11.0 | 1.4 | 6.8 |
| 6 | 34.2 | 0.63 | 30 | 147 | ___do___ | 10.0 | 2.3 | 5.0 |
| 7 | 33.0 | 0.78 | 30 | 160 | ___do___ | 11.5 | 1.5 | 1.7 |
| 8 | 33.0 | 0.78 | 40 | 160 | ___do___ | 9.9 | 0.8 | 1.0 |
| 9 | 27.6 | 0.99 | 40 | 147 | ___do___ | 13.6 | 1.0 | 1.0 |
| 10 | 27.7 | 0.9 | 40 | 147 | Solvent (toluene) | 9.0 | 1.1 | 1.2 |
| 11 | 27.9 | 0.97 | 40 | 147 | Extrusion | 19.8 | 1.0 | 1.0 |
| 12 | 27.9 | 0.97 | 40 | 147 | ___do___ | 10.9 | 1.2 | 1.3 |
| 13 | 27.9 | 0.97 | 40 | 147 | ___do___ | 8.0 | 1.6 | 1.7 |
| 14 | 31.5 | | 40 | 147 | Solvent (toluene) | 15.8 | 1.2 | 1.5 |
| 15 | 32.4 | 0.9 | 40 | 147 | Hot-melt | 15.3 | 1.1 | 1.6 |
| 16 | 32.4 | 0.9 | 40 | 147 | Extrusion | 23.0 | 1.2 | 1.3 |
| 17 | 34.2 | 0.63 | 40 | 147 | Hot-melt | 11.0 | 0.9 | 1.4 |
| 18 | 34.2 | 0.63 | 50 | 147 | ___do___ | 11.0 | 1.1 | 1.3 |
| 19 | 35.8 | 1.1 | 40 | [d] 165 | ___do___ | 13.0 | 3.1 | 3.2 |

[a] Determined with 0.25% by weight of E/VA copolymer in toluene at 30° C.
[b] Water vapor transmission reported for initial 24 hours at 100° F. and 90% vs. 5% relative humidity.
[c] Ratio of linear crease (in.) to area (in.$^2$) = 1.63.
[d] Microcrystalline wax.

The results show that there is a correlation between the water vapor transmission of the coated paper after creasing and the percentage of E/VA in the E/VA-wax composition. Based on these results, it is necessary, to be certain of acceptable moistureproofing of creased paper samples, to use an E/VA-wax coating which contains more than 30% E/VA. Of the two E/VA-wax compositions having an E/VA content of 30%, one gave acceptable moistureproofing of creased paper samples, while the other did not. The E/VA giving acceptable results had a melt index of 25 while that giving unacceptable results had a melt index of about 140. (Table I was used to correlate melt indices with the inherent viscosities shown in Table II).

One criterion of acceptable moistureproofing is that the water vapor transmission of the creased sample tive for moistureproofing as paraffin wax compositions. However, the addition of E/VA copolymer did result in the creased sample having essentially the same moistureproofing properties as the flat sample.

*Example 3*

In order to define more exactly the minimum content of E/VA required in the blend for acceptable moistureproofing of creased paper samples, a statistically designed experiment was carried out using a single E/VA copolymer containing 28% vinyl acetate and having a melt index of 15. Five different petroleum waxes were used in the study. The properties of these waxes, including the water vapor transmission determined on 22 lb. bleached sulfite paper samples coated with the waxes, are summarized in Table III.

TABLE III

WAX PHYSICAL PROPERTIES

| Type | Wax A Paraffin | Wax B Paraffin | Wax C Paraffin | Wax D Paraffin | Wax E Microcrystalline |
|---|---|---|---|---|---|
| Melting Pt., °F | 154 | 146 | 125 | 144 | 153 |
| Coated paper: | | | | | |
| Coating weight (lb./3,000 ft.$^2$) | 14.5 | 12.4 | 11.5 | 12.7 | 17.1 |
| Water vapor transmission rate [a] (g. H$_2$O/100 in.$^2$/24 hrs.): | | | | | |
| Flat | 0.2 | 0.2 | 1.5 | 0.6 | 0.4 |
| Creased [b] | 20.4 | 11.1 | 5.5 | 10.8 | 5.2 |

[a] Determined at 100° F. and 90% R.H. according to TAPPI T464m-45.
[b] Prepared according to TAPPI T465sm-52.

For each of the five sets E/VA-wax blends, a central composite rotatable design as described by W. G. Cochran and G. M. Cox, "Experimental Designs," 2nd edition, John Wiley & Sons, New York, 1957, pages 335–375 was used as the experimental model in determining the water vapor transmission rates (flat and creased) of the E/VA-wax coated paper as functions of the E/VA concentration and the coating weight. In this design, the E/VA concentration was varied from 11 to 39% and the coating weight from 6.5 to 23.5 lb./300 ft.² The design values for E/VA concentration and coating weight along with the coating weight actually obtained for each run are shown in Table IV.

excess of molten blend to the paper. An adjustable doctor blade controls the film thickness on the applicator roll. Because of the high viscosity of the blends, film thickness must be controlled in order to obtain the required coating weights. The excess coating is metered off the paper by a heated scraper bar. The resulting smooth coating is solidified by chill rolls cooled by water at 70° F. Blends containing 11–25% E/VA were applied with the melt temperature between 180 and 210° F. Blends above 25% E/VA were applied at 210–250° F.

The data obtained from determination of the water vapor transmission rates (WVTR) of flat and creased

TABLE IV

| Coating Run No. | Coded values a | | Actual percent E/VA | Actual coating weights obtained | | | | |
|---|---|---|---|---|---|---|---|---|
| | $X_1$ | $X_2$ | | Wax A | Wax B | Wax C | Wax D | Wax E |
| 1 | $-\sqrt{2}$ | 0 | 11 | 14.8 | 14.7 | 12.5 | 13.7 | 14.6 |
| 2 | $-1$ | $-1$ | 15 | 7.5 | 9.1 | 10.2 | 9.1 | 7.7 |
| 3 | $-1$ | $+1$ | 15 | 22.4 | 19.0 | 25.5 | 24.7 | 18.8 |
| 4 | $+1$ | $-1$ | 35 | 8.0 | 8.2 | 8.5 | 9.3 | 8.4 |
| 5 | $+1$ | $+1$ | 35 | 22.3 | 19.7 | 21.4 | 22.9 | 25.6 |
| 6 | $+\sqrt{2}$ | 0 | 39 | 14.9 | 17.4 | 14.5 | 16.0 | 13.2 |
| 7 | 0 | $-\sqrt{2}$ | 25 | 4.9 | 5.7 | 4.2 | 6.0 | 6.2 |
| 8 | 0 | $+\sqrt{2}$ | 25 | 24.2 | 25.2 | 22.9 | 22.3 | 22.6 |
| 9 | 0 | 0 | 25 | 15.8 | 13.5 | 14.5 | 15.0 | 14.0 |
| 10 | 0 | 0 | 25 | 13.6 | 16.3 | 15.5 | 14.2 | 13.6 |
| 11 | 0 | 0 | 25 | 16.1 | 15.9 | 15.9 | 15.0 | 14.2 |
| 12 | 0 | 0 | 25 | 14.9 | 16.4 | 15.0 | 14.0 | 14.0 |
| 13 | 0 | 0 | 25 | 14.8 | 14.1 | 13.5 | 17.0 | 13.9 | a See the following table:

| Coded values | $-\sqrt{2}$ | $-1$ | 0 | $+1$ | $+\sqrt{2}$ |
|---|---|---|---|---|---|
| $X_1$, Percent E/VA in blend | 11 | 15 | 25 | 35 | 39 |
| $X_2$, Coating weight, lb./3,000 ft.² | 6.5 | 9 | 15 | 21 | 23.5 |

The E/VA-wax blends and coated paper samples were prepared as follows:

E/VA-wax blends containing 11–25% E/VA were prepared by dissolving the resin in molten wax between 220–250° F. using a laboratory air motor mixer. Blends containing more than 25% E/VA were prepared in a sigma blade mixer at 220° F. These blends were then solidified for storage and remelted in the coater feed pan.

The E/VA-wax blends were applied to the wire side of a 22 lb. bleached sulfite paper by a method in which the paper "kisses" a heated applicator roll which is running flooded in a pan containing the molten E/VA-wax blend. The applicator roll, driven at the same speed and direction as the paper web, transfers a controlled coated paper samples at 100° F. and 90% R.H. according to TAPPI T464m–45 are shown in Table V. The creased samples were prepared according to TAPPI T465sm–52.

TABLE V

| Coating Run No. | Water vapor transmission rate (g./100 in.²/24 hours) | | | | | | | | |
|---|---|---|---|---|---|---|---|---|---|
| | Wax A | | Wax B | | Wax C | | Wax D | | Wax E | |
| | Flat | Creased | Flat | Creased | Flat | Creased | Flat | Creased | Flat | Creased |
| 1 | 0.30 | 12.4 | 0.33 | 7.40 | 1.41 | 5.08 | 0.28 | 6.53 | 0.51 | 4.37 |
| 2 | 0.30 | 9.57 | 0.36 | 7.83 | 1.05 | 5.29 | 0.65 | 6.80 | 1.25 | 8.50 |
| 3 | 0.17 | 7.30 | 0.15 | 3.68 | 0.34 | 1.96 | 0.15 | 3.92 | 0.54 | 4.40 |
| 4 | 0.46 | 0.80 | 0.43 | 1.00 | 1.05 | 2.19 | 0.24 | 0.69 | 2.12 | 4.85 |
| 5 | 0.25 | 0.40 | 0.32 | 0.40 | 0.77 | 0.98 | 0.17 | 0.33 | 1.00 | 1.34 |
| 6 | 0.58 | 0.65 | 0.36 | 0.56 | 1.15 | 1.16 | 0.18 | 0.49 | 1.15 | 1.77 |
| 7 | 1.92 | 12.4 | 0.37 | 6.00 | 2.69 | 11.80 | 0.46 | 6.21 | 1.63 | 6.18 |
| 8 | 0.25 | 0.47 | 0.21 | 0.87 | 0.56 | 0.86 | 0.22 | 0.35 | 0.82 | 1.15 |
| 9 | 0.19 | 0.61 | 0.20 | 0.49 | 0.91 | 1.17 | 0.17 | 0.90 | 1.04 | 1.74 |
| 10 | 0.24 | 0.61 | 0.20 | 0.99 | 0.82 | 1.07 | 0.30 | 0.38 | 1.10 | 1.98 |
| 11 | 0.13 | 0.40 | 0.24 | 0.79 | 0.98 | 1.28 | 0.32 | 0.88 | 1.22 | 1.80 |
| 12 | 0.22 | 1.21 | 0.28 | 0.64 | 1.32 | 1.62 | 0.22 | 1.68 | 1.15 | 1.65 |
| 13 | 0.22 | 0.78 | 0.25 | 0.62 | 0.96 | 1.27 | 0.26 | 1.12 | 1.75 | 2.47 |

The data in Table V were used to calculate the coefficients of the following second order polynomial by a regression analysis:

$$F(Y) = B_0 + B_1 X_1 + B_2 X_2 + B_{11} X_1^2 + B_{22} X_2^2 + B_{12} X_1 X_2$$

where $F(Y)$ = a function of the predicted value of the coated paper property, Y,
$X_1$ = E/VA concentration
$X_2$ = coating weight
$B_0$, $B_1$, $B_2$, $B_{11}$, $B_{22}$, $B_{12}$ = calculated coefficients.

Using $\log_e Y$ as the function for the flat and creased water vapor transmission rates, the coefficients in Table VI were calculated.

TABLE VI
FLAT WATER VAPOR TRANSMISSION RATES

|  | Wax A | Wax B | Wax C | Wax D | Wax E |
|---|---|---|---|---|---|
| $B_0$ | 1.9320 | 1.2541 | 2.2078 | 1.2995 | −0.4170 |
| $B_1$ | −0.0668 | −0.1115 | −0.0358 | −0.0320 | 0.1109 |
| $B_2$ | −0.3317 | −0.1639 | −0.1807 | −0.2174 | −0.1129 |
| $B_{11}$ | 0.0020 | 0.0018 | −0.0002 | −0.0008 | −0.0019 |
| $B_{22}$ | 0.0092 | 0.0023 | 0.0010 | 0.0025 | 0.0011 |
| $B_{12}$ | −0.0006 | 0.0023 | 0.0033 | 0.0035 | 0.0012 |

CREASED WATER VAPOR TRANSMISSION RATES

|  | Wax A | Wax B | Wax C | Wax D | Wax E |
|---|---|---|---|---|---|
| $B_0$ | 3.8160 | 3.5791 | 7.4196 | 7.8863 | 5.3398 |
| $B_1$ | −0.8648 | −1.1837 | −0.2016 | −0.2628 | −0.1289 |
| $B_2$ | −0.4713 | −0.4424 | −0.4574 | −0.3735 | −0.2725 |
| $B_{11}$ | 0.6597 | 0.5389 | 0.0024 | 0.0035 | 0.0026 |
| $B_{22}$ | 0.0126 | 0.0120 | 0.0097 | 0.0097 | 0.0090 |
| $B_{12}$ | −0.0207 | 0.0127 | 0.0027 | −0.0008 | −0.0031 |

The equations obtained when using these coefficients gave good fit with the data in Table V. This means that better than 90% of the variation in the data could be accounted for by the six terms of the equation. These equations were then used to define the relationship of water vapor transmission rate to the E/VA concentration in the E/VA-wax blends and the coating weights of the blends within the experimental region as shown in FIGURES 2–5.

Figure 2:
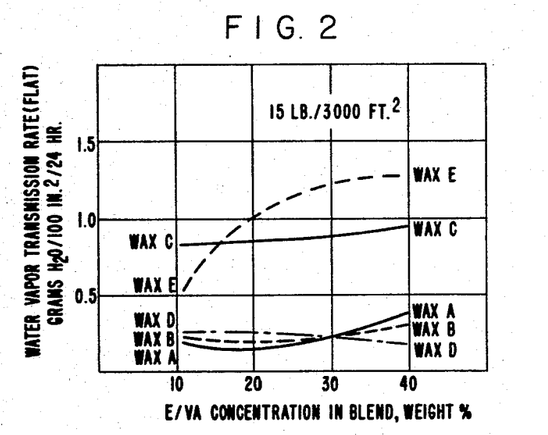
FIGURES 2 and 4 are graphs showing the effect of E/VA concentration in blends with five different petroleum waxes on the water vapor transmission rate of flat and creased paper samples, respectively, at a constant coating weight.

As shown in FIGURE 2 the addition of E/VA to the four paraffin waxes did not significantly affect the flat WVTR of the unmodified waxes. These values are 0.2–0.3 g. $H_2O$/100 in.$^2$/24 hrs. for the three higher melting point paraffin waxes and 0.8 g. $H_2O$/100 in.$^2$/24 hrs. for the low melting point paraffin wax—all at a constant coating weight of 15 lb./3000 ft.$^2$. FIGURE 2 also shows that the flat WVTR for the microcrystalline-E/VA coated paper increased with increasing E/VA concentrations and leveled out at 25% E/VA with a value of 1.3 g. $H_2O$/100 in.$^2$/24 hrs.

Figure 3:
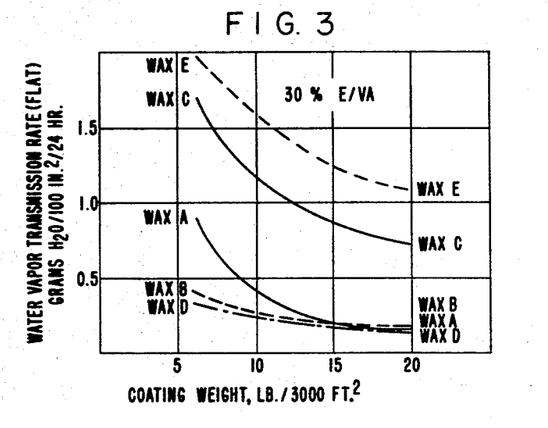
FIGURES 3 and 5 show the effect of coating weight on the water vapor transmission rate of flat and creased paper samples, respectively, at a constant E/VA concentration in blends with five different petroleum waxes.

FIGURE 3 shows the effect of the coating weight on the flat WVTR at a constant E/VA concentration of 30%. This shows that little improvement was obtained in the flat WVTR at coating weights above 15 lb./3000 ft.$^2$.

Figure 4:
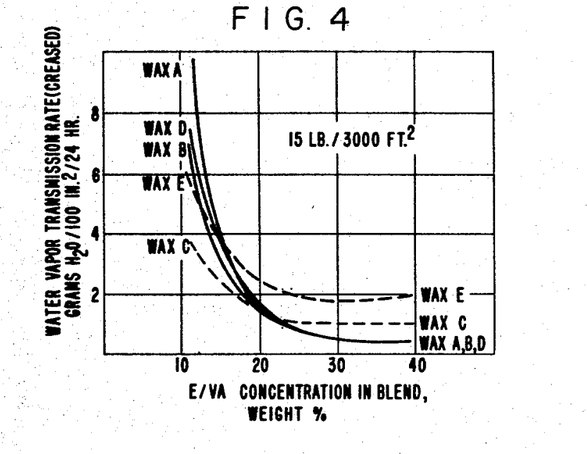

The effect of the E/VA concentration on the creased WVTR of the coated paper is illustrated in FIGURE 4 at a constant coating weight of 15 lb./3000 ft.$^2$. This shows that paper coated with blends containing 25% or more E/VA has excellent resistance to creasing and exhibits acceptable moistureproofing as evidenced by the small (less than 0.75 g./100 in.$^2$/24 hrs.) differential between the flat and creased WVTR. The creased WVTR ranges from 0.5 g. $H_2O$/100 in.$^2$/24 hrs. for the high melting point paraffin blends to 1.8 g./100 in.$^2$/24 hrs. for the microcrystalline blends. By comparison, a 15 lb./3000 ft.$^2$ extrusion coating of low density polyethylene has flat and creased values of 1.4 g. $H_2O$/100 in.$^2$/24 hrs. Thus, paper coated with E/VA-wax blends containing 25% or more resin is flexible and has water vapor barrier properties at least equivalent to paper extrusion coated with polyethylene.

The absolute increase in the WVTR caused by creasing paper coated with blends containing more than 25% E/VA was about the same for all of the waxes tested. The differences in the absolute creased values correspond to the variations in the flat values for the wax blends. Thus, the flexibility of the wax does not have an effect on the differential between the flat and creased WVTR at E/VA concentrations above 25%. At E/VA concentrations less than 25% the flexibility of the wax used does affect the creased WVTR.

Figure 5:
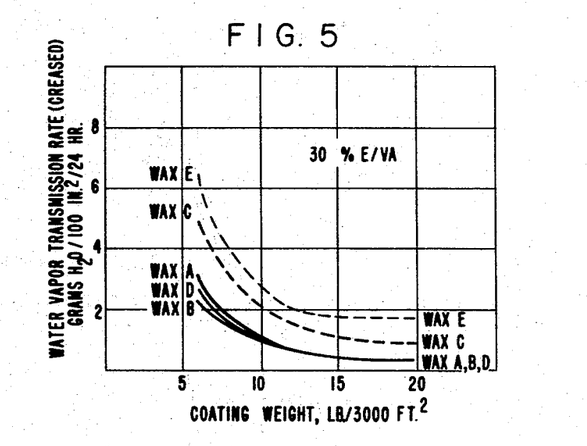

The coating weight necessary for a flexible coating is shown by FIGURE 5 to be about 12 lb./3000 ft.$^2$. No significant improvement was obtained with coating weights greater than 15 lb./3000 ft.$^2$. Therefore, to obtain a flexible, moisture vapor barrier on this particular grade of paper, a blend of 25% E/VA in wax, applied at 12 lb./3000 ft.$^2$, is required.

Example 4

The foregoing example demonstrated that a minimum of 25% of an E/VA having a vinyl acetate content of 28% and melt index of 15 was required for an E/VA-wax blend to provide acceptable moistureproofing of creased paper samples. To define further the variables affecting the minimal requirements of E/VA in the E/VA-wax blend, paper samples were coated as in Example 3 with the compositions indicated in Table VII. Paraffin wax B in Example 3 was used in all the E/VA-wax blends. The data obtained for the WVTR of flat and creased samples by the method used in Example 3 are also summarized in Table VII.

TABLE VII

| Coating Run No. | E/VA copolymer | | | Coating weight lb./3,000 ft.$^2$ | Water vapor transmission rate | |
|---|---|---|---|---|---|---|
|  | Percent VAc | Melt index | Percent in wax blend |  | Flat | Creased |
| 1 | 28 | 25 | 15 | 9 | 1.07 | 14.9 |
| 2 | 28 | 25 | 15 | 21 | 0.29 | 4.34 |
| 3 | 28 | 25 | 35 | 9 | 0.21 | 0.61 |
| 4 | 28 | 25 | 35 | 21 | 0.16 | 0.22 |
| 5 | 28 | 25 | 25 | 15 | a 0.27 | a 1.39 |
| 6 | 33 | 25 | 15 | 9 | 0.70 | 10.1 |
| 7 | 33 | 25 | 15 | 21 | 0.36 | 3.96 |
| 8 | 33 | 25 | 35 | 9 | 0.24 | 0.98 |
| 9 | 33 | 25 | 35 | 21 | 0.24 | 0.40 |
| 10 | 33 | 25 | 25 | 15 | a 0.33 | a 1.41 |
| 11 | 32 | 15 | 25 | 15 | b 0.17 | b 0.64 |
| 12 | 28 | 165 | 15 | 15 | 0.35 | 8.1 |
| 13 | 28 | 165 | 25 | 15 | c 0.24 | c 5.7 |
| 14 | 28 | 165 | 35 | 15 | 0.23 | 0.67 |
| 15 | 27 | 3 | 15 | 15 | 0.40 | 3.9 |
| 16 | 27 | 3 | 25 | 15 | b 0.27 | b 0.43 |
| 17 | 27 | 3 | 35 | 15 | 0.35 | 0.40 | a Average of 4 coating runs.
b Average of 2 coating runs
c Average of 3 coating runs.

Analysis of the data obtained in coating runs 1–10 indicates that acceptable moistureproofing of coated paper samples, as indicated by a difference in the flat and creased WVTR values of 0.75 g./100 in.$^2$/24 hrs., is obtained at an E/VA concentration of 28% with a coating weight of 15 lb./3000 ft.$^2$ for the two E/VA samples having a melt index of 25 and vinyl acetate contents of 28% and 33%.

This indicates that, within the vinyl acetate range between lines AF and DE of FIGURE 1, an E/VA copolymer with a melt index of 25 must be present at a 28% level to provide a wax composition with sufficient flexibility to give acceptable moistureproofing of creased paper samples. It further indicates that within this range of vinyl acetate, the factor which determines the minimum amount of E/VA copolymer required is the melt index. This is further demonstrated by the results obtained in coating run 11 in which a copolymer having a melt index of 15 and a vinyl acetate content of 32% provided acceptable moistureproofing at a 25% level in the E/VA-wax blend. This corresponds to the minimum E/VA level required with the E/VA having a melt index of 15 and vinyl acetate content of 28% used in Example 3.

Interpolation of the data from coating runs 12-14 shows that a concentration of 35% of E/VA having a melt index of 165 and a vinyl acetate content of 28% is required to provide acceptable moistureproofing of coated paper samples. This same level of E/VA content also provides acceptable moistureproofing with E/VA copolymers having higher melt indices up to 500, or preferably to 200.

Interpolation of the data from coating runs 15-17 establishes that acceptable moistureproofing is obtained with an E/VA having a melt index of 3 at a 21% level in the E/VA-wax blend.

The relationship between the melt index and the minimum amount of E/VA required in the wax blend to obtain flexible coatings, as measured by the attainment of acceptable moistureproofing of creased paper samples, is summarized as follows:

| E/VA melt index | Minimum percent E/VA in wax blend |
|---|---|
| 3 | 21 |
| 15 | 25 |
| 25 | 28 |
| 165-500 | 35 |

The relationship between the melt index and minimum E/VA copolymer content in the 0.1 to 500 melt index range may be expressed by the following equation:

$$\text{Percent copolymer} = 35 - 15(0.9715)^{MI}$$

where MI is the melt index of the copolymer. A graph of this equation and the four data points indicated above are shown in FIGURE 6. A comparison of the minimum percent copolymer calculated with the above equation and the experimentally determined values is indicated below:

| Melt index | Minimum percent copolymer | |
|---|---|---|
| | Observed | Calculated |
| 3 | 21 | 21.2 |
| 15 | 25 | 25.3 |
| 25 | 28 | 27.7 |
| 165 | 35 | 34.9 |

The equation thus gives calculated values within 0.3 percentage point of the observed values. The equation also agrees with the observation that a 35% level of copolymer is adequate with copolymers having melt indices up to 500.

*Example 5*

An E/VA copolymer was prepared having a mole ratio of 6.4/1 (32.4% vinyl acetate) and inherent viscosity of 1.17. Forty grams of this copolymer was heated with 60 grams of pale yellow microcrystalline wax having a melting point of 165° F. (Multiwax ML 445, Petroleum Specialties Co.) until a homogeneous melt was obtained. This melt had a viscosity of 5000 centipoises at 150° C. and was easily coated on paper with conventional hot-melt equipment.

*Example 6*

A mixture of 40 g. of 5/1 E/VA copolymer (38% vinyl acetate) having an inherent viscosity of 0.96 was melted with 60 g. of paraffin wax. The resultant composition when applied to cardboard is heat-sealable and highly adherent.

The compositions of the present invention have demonstrated marked superiority over conventional coatings, being particularly tough and flexible. Substrates coated with wax alone become moisture-permeable upon flexing, since the film is brittle and not highly adherent.

To illustrate further the superiority of the compositions of the present invention, a low molecular weight polyethylene now used commercially was applied to paper at a weight of 84 lb./ream and the composition of Example 5 was applied at 69 lb./ream. Both coated papers were repeatedly creased and tested for water vapor transmission by standard techniques. The transmission of vapor through the papers was as follows:

| | Water vapor transmission (g./in.²) | |
|---|---|---|
| | 48 hours | 120 hours |
| E/VA-wax | .034 | .078 |
| Polyethylene (low molecular weight) | .152 | .361 |

*Example 7*

Conditioning of E/VA-wax coated paper at 150° F. for four hours lowers the water vapor transmission of both flat and creased samples as indicated in Table VIII. Data which indicate the poorer moistureproofing obtained with kraft paper are also included in the table.

TABLE VIII

| Type of Paper | Loading,ᵃ lb./ream | WVT (g. H₂O/100 in.²/24 hours) | | | |
|---|---|---|---|---|---|
| | | Flat | Creased | Conditioned at 150° F. | |
| | | | | Flat | Creased |
| 25 lb. sulfite | 19 | 1.0 | 1.0 | 0.85 | 0.8 |
| Do | 14 | 1.1 | 1.3 | 0.7 | 0.9 |
| Do | 11 | 1.2 | 1.3 | | |
| 50 lb. coarse kraft | 19 | 2.6 | 2.8 | 2.1 | 2.2 |
| Do | 10 | 3.0 | 3.3 | | |

ᵃAll papers coated with 40% E/VA, 60% paraffin wax blend; E/VA contained 28% vinyl acetate and had inherent viscosity of 0.97; M.P. of wax, 147° F.

*Example 8*

Paper samples coated in Example 2 and listed in Table II were heat-sealed with a Sentinel Sealer at 250° F., 30 lb./in.² for 2 seconds or with a Palo Myer Sealer according to TAPPI Standard T642 sm-54. The seal strengths in g./in. were then determined on 1 inch wide samples at 73° F. with an Instron Tensile Tester using a crosshead speed of 5 in./min. The numerical values in parentheses reported in Table IX were the peak values obtained initially before the paper itself fails and fiber tear is obtained. With pigment (TiO₂)-coated sulfite paper (25 lb./ream), fiber tear is always obtained when the seal strength value exceeds about 200 g./in.

TABLE IX

| Sample No.[a][b] | E/VA Percent vinyl acetate | E/VA Percent in wax blend | Heat-seal strength[c][d] (g./in.) |
|---|---|---|---|
| 1 | 28.0 | 6 | 47 |
| 2 | 33.5 | 6 | 11 |
| 3 | 34.2 | 9 | 29 |
| 4 | 27.9 | 12 | 61 |
| 5 | 34.2 | 20 | 160 |
| 6 | 34.2 | 30 | 350 (420) |
| 7 | 33.0 | 30 | 375 (425) |
| 8 | 33.0 | 40 | 330 (360) |
| 10 | 27.7 | 40 | 260 (360) |
| 12 | 27.9 | 40 | 305 |
| 14 | 31.5 | 40 | 225 (360) |
| 17 | 34.2 | 40 | 440 (490) |
| 18 | 34.2 | 50 | 460 (500) |
| 19 | 35.8 | 40 | 380 |

[a] Refers to coated papers prepared in Example 2, Table II.
[b] Sentinel Sealer used on Samples 4,7,8,10,12,14. Palo Myer Sealer used on Samples 1,2,3,5,6,17,18,19.
[c] Sealed to itself.
[d] Fiber tear obtained with samples having heat-seal strength greater than 200.

The data in Table IX indicate that the amount of E/VA in the wax blend has a pronounced effect on the heat-seal strength of coated papers. Fiber tear was obtained consistently with E/VA-wax compositions containing 30% or more E/VA.

*Example 9*

Seal strengths were determined as in Example 8 with a series of paper samples coated with 40% E/VA–60% paraffin wax blends in which the percentage of vinyl acetate in the E/VA varied from 20 to 31.5% by weight and the inherent viscosities of the E/VA copolymers varied from 0.9 to 1.2. The results are summarized in Table X. All the samples were prepared by coating 25 lb./ream sulfite paper with toluene solutions of E/VA-wax containing 60% solids and heat-sealing the coated paper with a Sentinel Sealer as described in Example 8.

TABLE X

| E/VA, percent vinyl acetate | Loading, lb./ream | Heat-seal strength[a] (g./in.) |
|---|---|---|
| 20.0 | 11 | 75 |
| 24.7 | 12 | 100 |
| 26.0 | 13 | [b] 201 |
| 27.8 | 10 | [b] 257 |
| 29.1 | 10 | [b] 249 |
| 31.5 | 16 | [b] 225 |

[a] Sealed to itself. [b] Fiber tear.

The data in Table X indicate that below 25% vinyl acetate in the E/VA copolymer the seal strength is lower and fiber tear is not obtained.

*Example 10*

A statistically designed experiment similar to that utilized in Example 3 was used to investigate further the heat-sealing properties of E/VA-wax blends. The same E/VA and five petroleum waxes of Example 3 were used. The coated paper samples described in Table IV and four additional coating runs summarized in Table XI were used in a five-variable heat-seal design.

TABLE XI

| Coating Run No. | Coded values $X_1$ | Coded values $X_2$ | Actual percent E/VA | Actual coating weight obtained Wax A | Wax B | Wax C | Wax D | Wax E |
|---|---|---|---|---|---|---|---|---|
| 1 | 0 | −2 | 25 | 2.9 | 3.5 | 4.1 | 4.4 | 2.6 |
| 2 | 0 | +2 | 25 | 27.9 | 28.0 | 27.0 | 31.8 | 29.0 |
| 3 | −2 | 0 | 5 | 12.5 | 14.5 | 10.0 | 13.1 | 16.1 |
| 4 | +2 | 0 | 45 | 17.1 | 16.1 | 15.4 | 13.3 | 14.8 |

The five variables and the ranges of the variables used in this design were as follows: E/VA concentration, 5–45%; coating weight, 3–27.5 lb./3000 ft.²; heat-seal time, 0.5–2.5 seconds; heat-seal temperature, 180–280° F.; and heat-seal pressure, 20–40 p.s.i.g.

The coated paper samples were heat-sealed to the wire side of uncoated paper using a Sentinel Heat Sealer. The heat-seal conditions were varied within the ranges indicated above. The sealed specimens were conditioned for 24 hours at 73° F. and 50% relative humidity prior to delamination with an Instron Tensile Tester.

The heat-seal data so obtained were then used to calculate the 21 coefficients of an equation having terms for percent E/VA in the wax blend, coating weight, and heat-seal conditions of time, temperature and pressure for each of the five petroleum waxes. The equations were used to chart the effect of the E/VA concentration and coating weight on the quality of the heat-seal bonds for the different petroleum waxes. These charts showed that the bond strength was dependent on the wax used at E/VA concentrations below 25%. Each wax required a different minimum concentration of E/VA to attain a fiber-tearing bond. The choice of wax had no significant effect on heat-seal bond quality of coatings in the flexible region (E/VA concentrations above 25%, coating weight 12–15 lb./3000 ft.²). All bonds in this region were excellent.

In addition to the excellent heat-seal bonds obtained when sealing to uncoated paper, these E/VA-wax coatings give fiber tearing bonds to polyethylene, "Mylar" polyester film, "K" cellophane and aluminum foil.

Small amounts of pigments, dyes and the like may be added to the E/VA-wax coating compositions with retention of their desirable moistureproofing and heat-sealing properties. This is shown in the next example.

*Example 11*

A 40% E/VA–60% paraffin wax composition was dissolved in toluene to yield a 60% solids solution. The E/VA contained 28% vinyl acetate and had an inherent viscosity of 0.97. One portion of the solution was pigmented with 10% by weight of ASP–600 clay, based on the combined E/VA and wax. Another portion was pigmented with 10% by weight of a pigment-grade $TiO_2$. The pigmented solutions were applied to 25 lb./ream sulfite paper. The coated papers were heat-sealed using a Sentinel Sealer as described in Example 8. The heat-seal strengths were determined as before. The results are shown in Table XII.

TABLE XII

| Pigment | Loading, lb./ream | WVT (g. $H_2O$/100 in.²/24 hrs.) Flat | Creased | Heat-seal strength[a] (g./in.) |
|---|---|---|---|---|
| ASP-600 clay | 20 | 1.2 | 1.4 | [b] 280 |
| $TiO_2$ | 21 | 1.5 | 1.5 | [b] 243 |

[a] Sealed to itself. [b] Fiber tear.

*Example 12*

Paper samples coated with E/VA-wax (Numbers 5, 6, 17, and 18 from Example 2) were creased to a 180° angle at −20° F. and cracks were detected by noting the penetration of an organic dye solution. The low temperature flexibility of the E/VA-wax coated papers was found to be directly dependent on the E/VA content of the coating. At 40% or greater E/VA, no cracks developed. Slight failure occurred at 30% E/VA and severe failure at the 20% E/VA level.

The importance of compatibility in the E/VA-wax blends has already been mentioned. In addition to the reasons previously given, compatibility is important to the satisfactory extrusion coating of E/VA-wax compositions. Extrusion coating requires that the strength of the melt be adequate to prevent failure of the web between the die jaws and the point where the coating contacts the paper. E/VA-wax compositions containing 40% or more E/VA have adequate strength; however, because melt strength decreases with increasing temperature, it is desirable to operate at temperatures near the melting point of the wax. This requires the use of an E/VA copolymer which gives a homogeneous melt, that is, one whose haze point is within a few degrees of the melting point of the wax so that a homogeneous coating is applied.

The compatibility of the E/VA and wax also has an effect on the grease resistance of coated papers as indicated in Example 13.

*Example 13*

Pigment (TiO$_2$)-coated sulfite paper was coated with several blends of E/VA and paraffin wax (M.P. 147° F.) with varying vinyl acetate content in the E/VA and varying amounts of E/VA in the wax blend. The grease resistance of the paper was measured in a standard TAPPI test in which the time required for turpentine to break through the coating was determined. The results are summarized in Table XIII.

TABLE XIII

| Wax blend | | E/VA, percent vinyl acetate | Loading, lb./ream | Time (min.) to break through coating | ΔT$_h$ value from figure 1 |
|---|---|---|---|---|---|
| Percent E/VA | Percent wax | | | | |
| 0 | 100 | ------ | 11.2 | 1-3 | -------- |
| 40 | 60 | 34.2 | 11.2 | 6-10 | <5 |
| 20 | 80 | 34.2 | 11.5 | 1-2 | >5 |
| 9 | 91 | 34.2 | 11.0 | 1 | >5 |
| 9 | 91 | 27.0 | 12.6 | 10-15 | <5 |
| 6 | 94 | 28.7 | 10.4 | 10-15 | <2 |
| 6 | 94 | 24.8 | 10.4 | 10-15 | <2 |
| 3 | 97 | 27.0 | 10.5 | 10-15 | <2 |

The incompatible blends, that is, the ones which have a ΔT$_h$ greater than 5, gave coatings which were no better than the straight waxed paper control. It is noted that improved grease resistance was obtained with all of the compatible E/VA-wax compositions including those with relatively small amounts (3–9% of E/VA. These latter compositions are outside the scope of my compositions which are both flexible and compatible.

*Example 14*

Strips of "Mylar" polyester film were hot-melt coated with a compatible 40% E/VA–60% paraffin wax composition (27.6% vinyl acetate in E/VA) and an incompatible 40% E/VA–60% paraffin wax composition 19.7% vinyl acetate in E/VA). After conditioning the samples at 70° C. for 80 minutes, the optical densities of the films were measured at 7000 A. wave length using a Model 10, Cary Spectrophotometer. The extinction coefficients for the coated films, normalized to a 1 mil coating thickness, were 0.34 and 0.61, respectively. Since clarity of the films is inversely proportional to the extinction coefficient, these results indicate that the compatible blend gives a much clearer coating than the incompatible blend.

If desired, a wax antioxidant, for example tert-butylhydroxyanisole, may be added to my compositions at a concentration of about 25 p.p.m. to provide stability against oxidative degradation, particularly at elevated temperatures up to about 200° C.

The properties shown by my mixture of E/VA and wax are unique and unexpected. The compositions, when blended in the proportions within the closed area ABCD of FIGURE 1 and with E/VA copolymers having the required melt index range, are tough, flexible materials which, when coated on paper or paperboard, have many applications in the packaging industry. The coatings retain their moistureproofing properties even after flexing and can be heat-sealed to give strong bonds. The coatings can be pigmented and they provide improved grease resistance over unmodified wax coatings. Paper, paperboard, and other flexible substrates coated with the compositions of this invention can be used in milk cartons, multiwall bags, corrugated boxes, flexible barrier packages for dry foods, heat-sealable aluminum overwraps and heat-sealable labels.

In addition to the flexible and heat-sealable assemblies obtainable by coating the E/VA-wax compositions of this invention on paper or other flexible substrates, the compositions of the invention can also be used to make molded and shaped articles. In this application, use is made of the surprising tensile strength and elongation exhibited by the compositions, even though they may consist of more than 50% of an economical petroleum wax. For example, the tensile strength and percent elongation at break of a homogeneous blend of 40% of an E/VA having a vinyl acetate content of 28% and melt index of 15 and 60% of paraffin wax are about 750 lb./in.$^2$ and 80%, respectively.

Shaped or molded articles may be prepared from E/VA-wax compositions by standard manufacturing techniques, for example, by conventional injection molding. Another method, known as flush molding, can also be used. In this method, a molten E/VA-wax blend at about 100° C. is poured into a split mold which is cooled either by ambient conditions or by immersion of the outer jacket in water. The E/VA-wax melt solidifies from the walls of the split mold inward. The length of time the melt is left in the mold determines the wall thickness of the object formed. After a pre-determined time, the split mold is inverted and the melt which has not solidified is poured out. The formed object is allowed to solidify completely and is then removed from the mold.

The E/VA-wax compositions of this invention are also of value as hot-melt adhesives.

The embodiments of the invention in which an exclusive property or privilege is claimed are defined as follows:

1. A flexible and compatible composition consisting essentially of petroleum wax and a copolymer of ethylene and vinyl acetate, said copolymer having a melt index of 0.1 to 500, the weight percentages of said wax and said copolymer in said composition and the weight percentage of vinyl acetate in said copolymer being represented by a point within the closed area ABCD of FIGURE 1, which composition has a minimum copolymer content defined by the equation:

$$\text{Percent copolymer} = 35 - 15(0.9715)^{MI}$$

where MI represents the melt index of the copolymer.

2. The composition of claim 1 in which the copolymer of ethylene and vinyl acetate has a melt index of 0.1 to 200.

3. The composition of claim 1 in which the petroleum wax is paraffin wax.

4. The composition of claim 1 in which the petroleum wax is microcrystalline wax.

5. A homogeneous melt consisting essentially of petroleum wax and a copolymer of ethylene and vinyl acetate, the haze point of said melt being within 5° C. of the melting point of said wax, the weight percentages of said wax and said copolymer in said melt and the weight percentage of vinyl acetate in said copolymer being represented by a point within the closed area ABCD of FIGURE 1, which melt has a minimum copolymer content defined by the equation:

$$\text{Percent copolymer} = 35 - 15(0.9715)^{MI}$$

where MI represents the melt index of the copolymer, said copolymer having a melt index of 0.1 to 500.

6. The melt of claim 5 in which the petroleum wax is paraffin wax.

7. The melt of claim 5 in which the petroleum wax is microcrystalline wax.

8. A flexible and compatible composition consisting essentially of petroleum wax and a copolymer of ethylene and vinyl acetate, said copolymer having a melt index of 0.1 to 500, the weight percentages of said wax and said copolymer in said composition and the weight percentage of vinyl acetate in said copolymer being represented by a point within the closed area BCEF of FIGURE 1.

9. The composition of claim 8 in which the copolymer of ethylene and vinyl acetate has a melt index of 0.1 to 200.

10. The composition of claim 9 in which the petroleum wax is paraffin wax.

11. The composition of claim 9 in which the petroleum wax is microcrystalline wax.

12. A flexible and compatible composition consisting essentially of 60 weight percent of petroleum wax and 40 weight percent of a copolymer of ethylene and vinyl acetate, said copolymer containing 28 to 35 weight percent of copolymerized vinyl acetate and having a melt index of 0.1 to 200.

13. A flexible and heat-sealable assembly comprising a flexible substrate and a coating composition thereon, said coating composition consisting essentially of petroleum wax and a copolymer of ethylene and vinyl acetate, said copolymer having a melt index of 0.1 to 500, the weight percentages of said wax and said copolymer in said composition and the weight percentage of vinyl acetate in said copolymer being represented by a point within the closed area ABCD of FIGURE 1, which coating composition has a minimum copolymer content defined by the equation:

$$\text{Percent copolymer} = 35 - 15(0.9715)^{MI}$$

where MI represents the melt index of the copolymer.

14. A flexible and heat-sealable assembly according to claim 13 in which the flexible substrate is paper.

15. A flexible and heat-sealable substrate according to claim 14 in which the petroleum wax is paraffin wax.

16. A flexible and heat-sealable assembly comprising a paper substrate and a coating composition thereon, said coating composition consisting essentially of petroleum wax and a copolymer of ethylene and vinyl acetate, said copolymer having a melt index of 0.1 to 500, the weight percentages of said wax and said copolymer in said composition and the weight percentage of vinyl acetate in said copolymer being represented by a point within the closed area ABCD of FIGURE 1, which coating composition has a minimum copolymer content defined by the equation:

$$\text{Percent copolymer} = 35 - 15(0.9715)^{MI}$$

where MI represents the melt index of the copolymer, the assembly having a differential of not more than 0.75 g./100 in.$^2$/24 hrs. between the flat and creased water vapor transmission rates.

17. A shaped article comprising a flexible and compatible composition consisting essentially of petroleum wax and a copolymer of ethylene and vinyl acetate, said copolymer having a melt index of 0.1 to 500, the weight percentages of said wax and said copolymer in said composition and the weight percentage of vinyl acetate in said copolymer being represented by a point within the closed area ABCD of FIGURE 1, which composition has a minimum copolymer content defined by the equation:

$$\text{Percent copolymer} = 35 - 15(0.9715)^{MI}$$

where MI represents the melt index of the copolymer.

18. A shaped article according to claim 17 in which the petroleum wax is paraffin wax.

19. A shaped article comprising a flexible and compatible composition consisting essentially of petroleum wax and a copolymer of ethylene and vinyl acetate, said copolymer having a melt index of 0.1 to 500, the weight percentage of said wax and said copolymer in said composition and the weight percentage of vinyl acetate in said copolymer being represented by a point within the closed area BCEF of FIGURE 1.

20. A shaped article according to claim 19 in which the petroleum wax is paraffin wax.

21. A heat-sealable flexible sheet material having on one surface thereof a thermoplastic wax composition coating having a melt viscosity of between 2000 and 15,000 centipoises measured at 290° F., said wax composition comprising between about 50% and 70% of a petroleum wax having a melting point between about 130° F. and 170° F., and between about 50% and 30% of a copolymer of ethylene and vinyl acetate, said copolymer being the copolymerization product of ethylene and vinyl acetate in ratio between about 2 to 1 and 4 to 1.

References Cited by the Examiner

UNITED STATES PATENTS 2,877,196   3/59   Reding _____________ 260—28.5
3,048,553   8/62   Moss _______________ 260—28.5

MORRIS LIEBMAN, *Primary Examiner.*